(12) United States Patent
Aanonsen et al.

(10) Patent No.: US 7,445,028 B1
(45) Date of Patent: Nov. 4, 2008

(54) CHECK VALVES

(75) Inventors: Lloyd B. Aanonsen, Old Tappan, NJ (US); Wade J. Craddock, Tucson, AZ (US); Richard J. DiGiovanni, Valley Cottage, NY (US)

(73) Assignee: General Rubber Corporation, Carlstadt, NJ (US)

( * ) Notice: Subject to any disclaimer, the term of this patent is extended or adjusted under 35 U.S.C. 154(b) by 578 days.

(21) Appl. No.: 11/235,680

(22) Filed: Sep. 26, 2005

(51) Int. Cl.
*F16K 15/14* (2006.01)

(52) U.S. Cl. ............... 137/846; 137/512.4; 137/849

(58) Field of Classification Search ............... 137/217, 137/218, 632, 512, 844, 845, 846, 849, 843; 137/512.4; 141/67; 222/110, 181, 490, 494; 239/525; 29/458; 409/136; 417/566; 464/17; 604/167, 537; 623/2.17, 2.18, 2.19, 2.38; 251/331, 5
See application file for complete search history.

(56) References Cited

U.S. PATENT DOCUMENTS

| | | | | |
|---|---|---|---|---|
| 2,818,089 A | * | 12/1957 | Mayhill | ............ 141/67 |
| 2,918,089 A | * | 12/1959 | McFarland, Jr. | ............ 251/331 |
| 2,922,437 A | * | 1/1960 | Rippingilla | ............ 137/844 |
| 3,415,485 A | * | 12/1968 | Hirs et al. | ............ 251/5 |
| 3,548,417 A | * | 12/1970 | Kischer et al. | ............ 623/2.17 |
| 3,707,986 A | * | 1/1973 | Breen | ............ 137/849 |
| 4,222,126 A | * | 9/1980 | Boretos et al. | ............ 623/2.19 |
| 4,492,253 A | | 1/1985 | Raftis | |
| 4,585,031 A | | 4/1986 | Raftis et al. | |
| 4,607,663 A | | 8/1986 | Raftis et al. | |
| 5,606,995 A | | 3/1997 | Raftis | |
| 5,727,593 A | | 3/1998 | Duer | |
| 5,931,197 A | | 8/1999 | Raftis et al. | |
| 2001/0054448 A1 | * | 12/2001 | McFarland | ............ 137/849 |
| 2006/0054229 A1 | * | 3/2006 | van der Meijden et al. | .. 137/849 |

* cited by examiner

*Primary Examiner*—Terrell Mckinnon
*Assistant Examiner*—Macade Brown
(74) *Attorney, Agent, or Firm*—Arthur Jacob (57) ABSTRACT

Duck-bill type check valves each include an inlet, an outlet spaced longitudinally from the inlet, and a bill adjacent the outlet and having at least one fold extending longitudinally along the bill for enabling unfolding of the at least one fold to open the outlet and permit the flow of fluid from the inlet for discharge through an opening at the outlet in response to minimum fluid forces upon the bill, and to provide the opening with an increased maximum available perimeter.

32 Claims, 7 Drawing Sheets

CHECK VALVES

TECHNICAL FIELD

The present invention relates generally to check valves and pertains, more specifically, to check valves of the type known as "duck-bill" check valves. More particularly, the invention provides improved duck-bill check valve configurations well suited for attachment to effluent pipes where it is desired to facilitate the passage of fluid from the pipe while preventing backflow into the pipe.

BACKGROUND ART

Check valves of the type known as "duck-bill" check valves have been used successfully for a very long time in the control of the flow of fluid where it is desired to pass fluid through a conduit in one direction and prevent flow in an opposite direction. In particular, duck-bill check valves have been coupled to effluent pipes to allow the flow of effluent out of such a pipe, while preventing reverse flow, or backflow, into the pipe as a result of a build-up of pressure downstream of the valve. These valves employ a resiliently flexible tubular valve body having a bill-like section terminating at the valve outlet. The outlet is biased into a closed configuration by the resilient nature of the valve body, and opens in response to fluid pressure within the pipe to discharge flow through the outlet. The outlet is closed upon build up of back pressure downstream of the valve.

Duck-bill check valves, while relatively simple in design and construction, exhibit some drawbacks, especially when provided in the larger sizes employed in connection with large effluent pipes, such as those found in storm drain systems. A common problem is inversion, that is, upon a build-up of back pressure at the outlet of the valve, the bill will tend to collapse and invert, thus opening the valve to backflow. Attempts to stiffen or reinforce the bill against inversion have resulted in the requirement for greater pressure upstream of the valve in order to open the valve for the discharge of effluent, with a concomitant build-up of effluent in the system upstream of the valve. In addition, the accumulation of larger volumes of effluent within the valve itself leads to deleterious sagging of the valve due to the weight of the effluent contained within the valve.

DISCLOSURE OF THE INVENTION

The present invention provides a check valve of the duck-bill type which resists inversion, even in larger sizes, and which reduces the pressure differential, or head, required to open the valve, for more effective performance in dealing with effluent. As such, the present invention attains several objects and advantages, some of which are summarized as follows: Provides a check valve of the duck-bill type having increased resistance to collapse and inversion in response to higher back pressures downstream of the valve; allows opening of the check valve in response to lower pressure differentials across the valve for better performance in the control of effluent in a wider variety of fluid flow systems; resists deleterious sagging of the body of the valve due to the weight of fluid contained within the body of the valve, especially in larger valve sizes, for more effective performance in a wider range of installations; enables effective use of relatively simple duck-bill type check valves in larger sizes in connection with larger effluent systems, such as in storm drain systems; provides a more compact duck-bill check valve, both in length and in diameter, and especially in duck-bill width, for ready installation and use in a wider variety of fluid handling systems; enhances performance in fluid handling systems incorporating duck-bill type check valves; provides duck-bill check valves capable of economical manufacture in a wide range of sizes for exemplary performance over an extended service life.

The above objects and advantages, as well as further objects and advantages, are attained by the present invention, which may be described briefly as a check valve comprising: a flexible tubular valve member extending longitudinally between an inlet and a longitudinally opposite outlet, the flexible tubular valve member having a longitudinal passage for conducting a fluid from the inlet to the outlet, and a valve wall extending longitudinally between the inlet and the outlet and circumferentially around the passage;

the valve wall including a bill extending longitudinally along the valve wall and terminating at a bill end contiguous with the outlet, the bill having a bill wall including laterally opposite lips extending in longitudinal and altitudinal directions adjacent the outlet and having a prescribed altitudinal extent, the bill wall including a transition portion extending longitudinally between the inlet and the lips, and the lips being biased in lateral directions into engagement with one another along a slit extending altitudinally across the bill adjacent the bill end such that the outlet normally is closed against backflow of the fluid into the passage through the outlet by engagement of the lips along the slit; and at least one fold in the bill wall, the fold extending longitudinally along a corresponding lip and, when in a folded configuration, including overlying legs extending across the bill in an essentially altitudinal direction, essentially parallel to the slit, so as to overlie the corresponding lip, the fold having a prescribed altitudinal extent and a prescribed longitudinal extent such that upon fluid entering the passage at the inlet and exerting fluid forces upon the valve wall at the bill to unfold the at least one fold and move the legs of the fold laterally, the relative dimensions of the altitudinal extent of the legs of the fold and the altitudinal extent of the bill enables unfolding of the at least one fold and lateral movement of the legs of the fold to part the lips in lateral directions and open the outlet to permit the flow of fluid from the inlet for discharge through an opening at the outlet of the valve member in response to minimum fluid forces upon the bill, and for providing the opening with an increased maximum available perimeter.

In addition, the present invention provides a check valve comprising: a flexible tubular valve member extending longitudinally between an inlet and a longitudinally opposite outlet, the flexible tubular valve member having a longitudinal passage for conducting a fluid from the inlet to the outlet, and a valve wall extending longitudinally between the inlet and the outlet and circumferentially around the passage; the valve wall including a bill extending longitudinally along the valve wall and terminating at a bill end contiguous with the outlet, the bill having a bill wall including laterally opposite lips extending in longitudinal and altitudinal directions adjacent the outlet and having a prescribed altitudinal extent, the bill including a transition portion extending longitudinally between the inlet and the lips, and the lips being biased in lateral directions into engagement with one another along a slit extending altitudinally across the bill adjacent the bill end such that the outlet normally is closed against backflow of the fluid into the passage through the outlet by engagement of the lips along the slit; the bill wall being folded essentially altitudinal upon itself to establish at least one folded portion in the valve wall, the at least one folded portion extending longitudinally along the a corresponding lip and, when in a folded configuration, including overlying legs extending across the bill in an essentially altitudinal direction, essentially parallel to the slit, so as to overlie the corresponding lip, the at least one folded portion having a prescribed altitudinal extent and a prescribed longitudinal extent such that upon fluid entering the passage at the inlet and exerting fluid forces upon the valve wall at the bill to unfold the at least one folded portion and move the legs of the at least one folded portion laterally, the relative dimensions of the altitudinal extent of the legs of the at least one folded portion and the altitudinal extent of the bill enables unfolding of the at least one folded portion and lateral movement of the legs of the at least one folded portion to part the lips in lateral directions and open the outlet to permit the flow of fluid from the inlet for discharge through an opening at the outlet of the valve member in response to minimum fluid forces upon the bill, and for providing the opening with an increased maximum available perimeter.

BRIEF DESCRIPTION OF DRAWINGS

The invention will be understood more fully, while still further objects and advantages will become apparent, in the following detailed description of preferred embodiments of the invention illustrated in the accompanying drawing, in which.

DETAILED DESCRIPTION OF DRAWINGS

Referring now to the drawing, and especially to FIGS. 1 through 4 thereof, a check valve constructed in accordance with the present invention is shown at 20. Check valve 20 is of the duck-bill type and is seen to include a valve body in the form of a tubular valve member 22 constructed of a resiliently flexible material, usually in the form of an elastomeric material such as rubber or the like, as is now common in the manufacture of duck-bill type check valves. Valve member 22 extends longitudinally between an inlet 24 and a longitudinally opposite outlet 26 and has a longitudinal passage 30 for conducting a fluid from the inlet 24, which is located at upstream end 32 of the valve member 22, to the outlet 26, which is located at the downstream end 36 of the valve member 22. A valve wall 38 extends longitudinally from the inlet 24 to the outlet 26 and extends circumferentially around passage 30.

Figure 1:
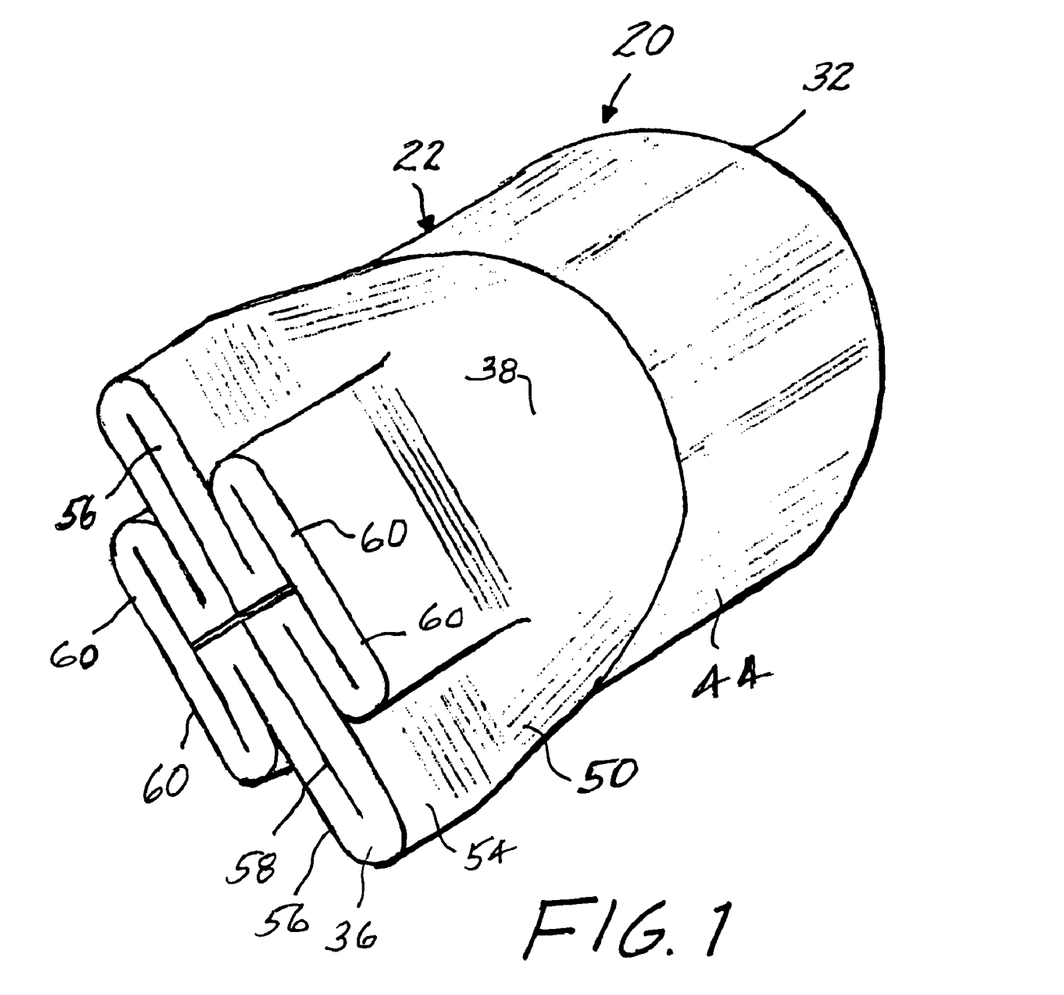
FIG. 1 is an end and side pictorial view of a check valve constructed in accordance with the present invention.
Figure 2:
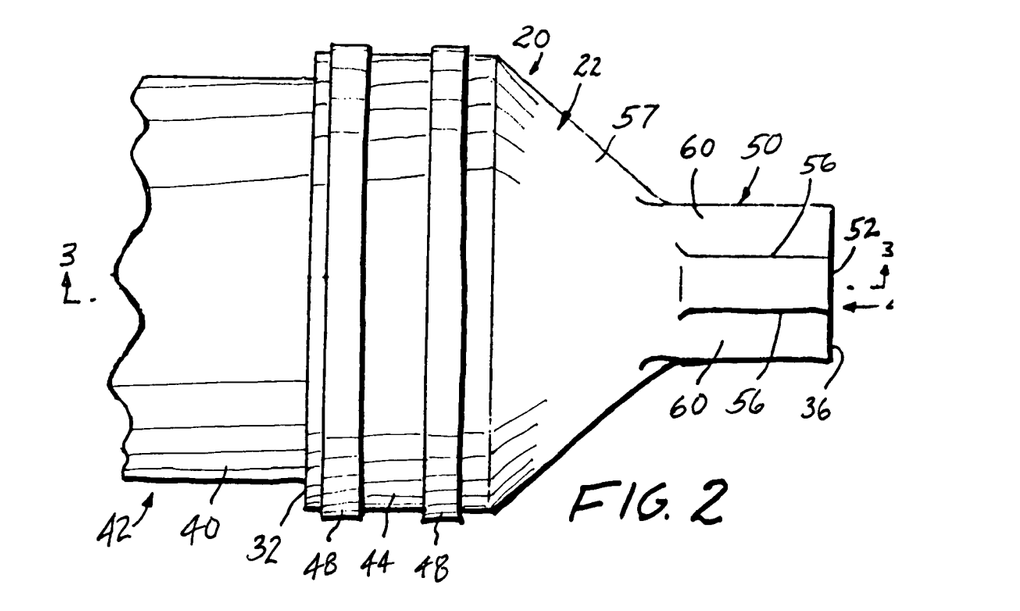
FIG. 2 is a top plan view of the check valve.
Figure 3:
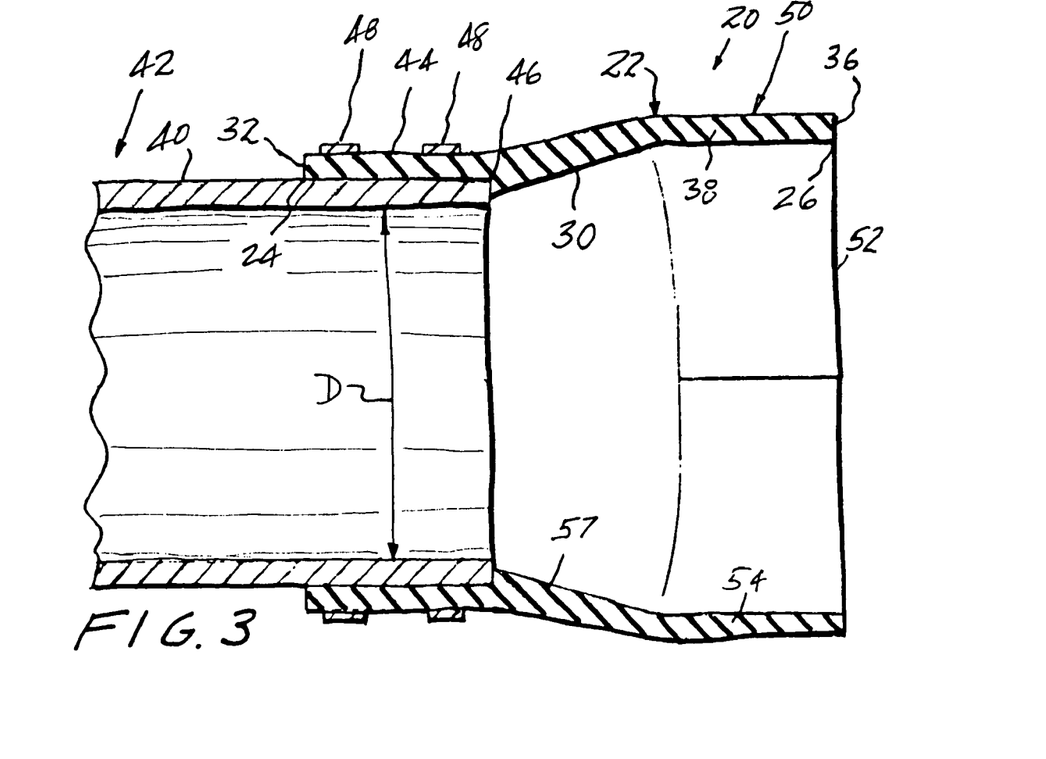
FIG. 3 is a longitudinal cross-sectional view taken along line 3-3 of FIG. 2.
Figure 4:
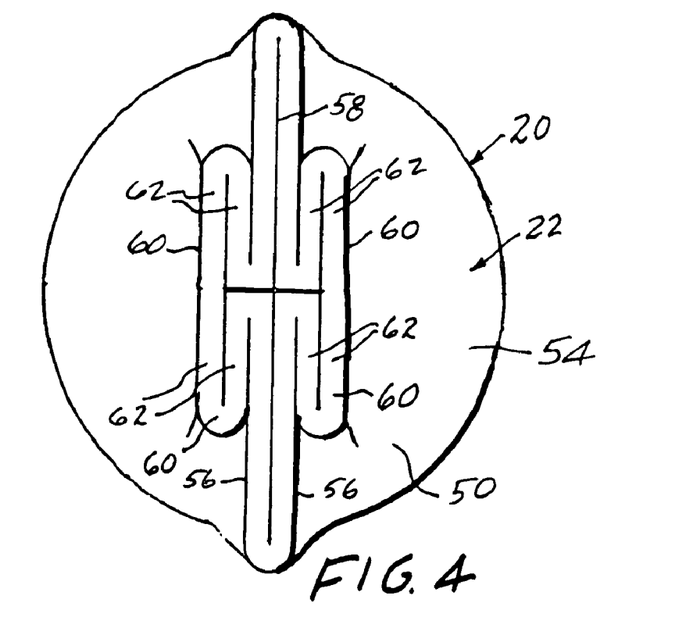
FIG. 4 is an end elevational view taken in the direction of arrow 4 in FIG. 2, showing the check valve closed.

As seen in FIGS. 2 and 3, check valve 20 is coupled to an effluent pipe 40 of a fluid handling system 42 for receiving a flow of fluid through the inlet 24 of the valve member 22. To that end, valve member 22 includes a collar 44 adjacent the upstream end 32, at inlet 24, the collar 44 having in inside diameter essentially complementary to the outside diameter of the effluent pipe 40 so that collar 44 is fitted over the end 46 of pipe 40 and is secured in place by means of a pair of clamping straps 48 cinched around collar 44. A bill 50 extends longitudinally along valve wall 38, from the collar 44 to the outlet 26, the bill 50 terminating at a bill end 52 contiguous with the outlet 26 at the downstream end 36. Bill 50 is illustrated in a normally closed configuration, wherein outlet 26 is closed against the flow of fluid through the outlet 26 in either a downstream direction or an upstream direction.

Bill 50 has a bill wall 54 which includes laterally opposite lips 56 extending essentially longitudinally adjacent bill end 52, and a transition portion shown in the #form of transition section 57 extending longitudinally from the collar 44 to the lips 56. By virtue of the memory characteristics of the material of the valve member 22, biasing forces are established for biasing the lips 56 in lateral directions into engagement with one another along a slit 58 extending across the bill 50 adjacent the bill end 52 such that the outlet 26 is normally closed against the flow of fluid downstream through passage 30 and discharge out of the check valve 20, through outlet 26, and against the backflow of fluid upstream into passage 30 of the check valve 20, through outlet 26, by the engagement of the lips 56 along the slit 58. In a common orientation of check valve 20 in a fluid handling system such as fluid handling system 42, lips 56 are oriented so that the altitudinal direction is aligned with the illustrated vertical direction and the slit 58, which extends altitudinally across the bill 50, is oriented in the vertical direction.

Figure 5:
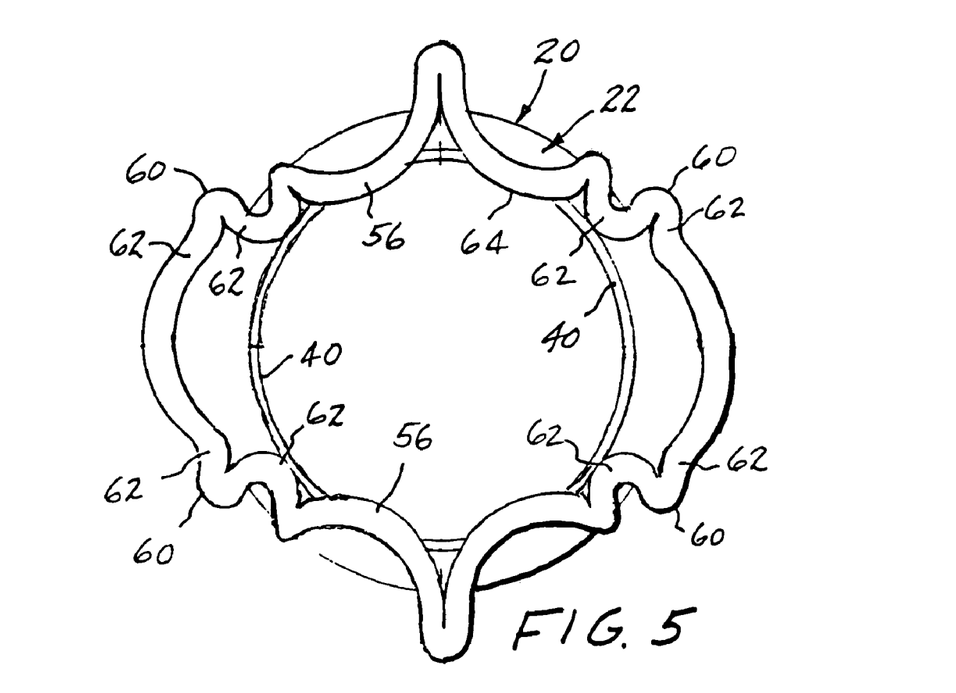
FIG. 5 is an end elevational view similar to FIG. 4, but showing the check valve open.

Turning now to FIG. 5, as well as FIGS. 1 through 4, check valve 20 is constructed to enable opening of the outlet 26 to allow the flow of fluid downstream and discharge through the outlet 26 with only minimal fluid forces upon the bill 50. Thus, valve wall 38 is provided with folded portions, shown in the form of folds 60 extending longitudinally along each lip 56 of bill wall 54. When in the folded configuration illustrated in FIGS. 1 through 4, folds 60 include legs 62 overlying one another and extending across the bill 50 in essentially altitudinal directions, essentially parallel to slit 58, so as to overlie corresponding lips 56. The folds 60 are biased into the folded configuration illustrated in FIGS. 1 through 4 by biasing forces established by the memory characteristics of the material of valve member 22, and are dimensioned and configured, with each fold 60 having a prescribed altitudinal extent and a prescribed longitudinal extent, such that upon fluid entering the passage 30 at the inlet 24 and exerting fluid forces upon the valve wall 38 at the bill 50 tending to unfold the folds 60 and move the legs 62 of the folds 60 laterally, the relative dimensions of the altitudinal extent of the legs 60 and the altitudinal extent of the bill 50, together with the resilient nature of the material of valve member 22, enables unfolding of the folds 60 and lateral movement of the legs 62 to part the lips 56 in lateral directions and open the outlet 26, as shown in FIG. 5, for allowing the flow of fluid downstream in passage 30, from the inlet 26 to be discharged through an opening 64 at outlet 26 with only minimal forces upon the bill 50. In the embodiment illustrated in FIGS. 1 through 5, folds 60 are placed such that the two folds 60 which overlie each lip 56 are arranged serially in an altitudinal direction along the corresponding lip 56 and are contiguous with one another. Preferably, the legs 62 of each fold 60 are molded unitary with the fold 60, and the folds 60 are molded unitary with the valve wall 38, along the bill wall 54 and corresponding lips 56.

The inclusion of folds 60 provides not only a high degree of flexibility for enabling opening of check valve 20 with minimum fluid forces on bill 50 for downstream flow of fluid and discharge through outlet 26, but does so with increased resistance to inversion when bill 50 is subjected to back pressures, the folds 60, when folded, serving to reinforce the lips 56 against inversion by back pressure forces on bill 50. In addition, the reinforcement provided by the folds 60 resists sagging of the check valve 20 during the flow of fluid downstream through the check valve 20. Moreover, the inclusion of folds 60 enables an increase in the perimeter of the opening 64 to provide a maximum perimeter at least as great as, and even somewhat greater than, the perimeter of the outlet of effluent pipe 40, as illustrated in FIG. 5, thereby allowing a full one-hundred percent flow of fluid from the pipe 40 through the valve 20 and minimizing the head required to open the valve 20 and pass fluid downstream for discharging through opening 64 at outlet 26. Further, the large transverse dimension provided by opening 64 enables a sphere of a diameter equal to the inside diameter of pipe 40 to pass through the opening 64, thus allowing the passage and discharge of larger pieces of debris, with a concomitant reduction of clogging of the fluid handling system.

The prior art has recognized that by providing a larger opening at the outlet of a duck-bill type check valve, relative to the size of the fluid conduit to which the valve is coupled, the valve can be operated successfully at a lower fluid pressure differential, or head, thereby gaining greater effectiveness in a fluid flow system. However, due to conventional manufacturing techniques, difficulties have been encountered when attempting to mold a conventional straight duck-bill valve body in which the perimeter of the opening of the valve would exceed the perimeter of the inside diameter of the pipe to which the valve is coupled. Thus, the perimeter of the outlet opening of conventional duck-bill type check valves often is limited to something less than the perimeter of the outlet of the pipe to which the valve is coupled. The width of the bill of such a conventional duck-type check valve generally is limited to less than one-half the perimeter of the outlet of the pipe. Since the perimeter of the outlet of the pipe is equal to $\pi$ times the inside diameter D of the pipe, or 3.14 times D, the width of the bill of a conventional duck-bill type check valve, that is, the extent of the duck-bill in the direction transverse to the direction of flow through the valve, is usually something less than 1.57D (one-half the perimeter of the pipe outlet). Attempts to increase the perimeter of the opening of a conventional duck-bill type check valve to meet or exceed the perimeter of the outlet of the pipe have required that the width of the duck-bill exceed 1.57D, with a concomitant increase in the overall width of the valve body.

The provision of folds 60 in a duck-bill type check valve constructed in accordance with the present invention, as described above, allows the construction of a duck-bill type check valve having an outlet opening with a perimeter at least as great as the perimeter of the pipe outlet, and which can even exceed the perimeter of the pipe outlet, without going beyond the 1.57D limitation of the width of the duck-bill, thereby attaining the advantages of such a construction in a readily manufactured valve member. These advantages include the ability to construct a relatively compact valve which still provides an opening having a perimeter as great as, or even greater than, the perimeter of the pipe to which the valve is coupled. Such a compact valve is readily installed in a wider range of fluid flow systems, including systems in which installation space is limited, by virtue of the reduced length and width of the valve. The limited length and width of bill 50, attained by the inclusion of folds 60, increases resistance to inversion and sagging. The relatively short bill 50 minimizes the length and the width of transition section 57. The resulting reduced area, viewed from downstream of the valve (as in FIG. 4), better resists back pressure, thereby providing greater resistance to inversion. The shorter length of transition section 57 resists sagging through a reduction of the volume of fluid contained within the transition section 57, and the concomitant reduction of weight supported by the transition section 57. Further, where the altitudinal orientation of the lips 56 and the slit 58 is aligned with a vertical direction, as illustrated, the folds 60 provide reinforcement against sagging. In addition, the inclusion of folds 60 provides frictional forces between the legs 62 of the folds 60, when in the folded configuration, which frictional forces resist back pressure and consequent inversion. Unlike prior art duck-bill check valves in which resistance to inversion and sagging is sought by increasing rigidity in the material of the bill, with the consequence that greater fluid forces are required to open the valve for the discharge of fluid downstream through the valve, the folds 60 of the present check valve 20 provide a flexibility which facilitates opening of the bill 50 for downstream flow and discharge in response to minimal fluid forces. Likewise, prior art suggestions to increase bill width to attain a larger size opening at the outlet of a duck-bill check valve, together with greater ease of opening, results in a larger transition section with a concomitant increase in vulnerability to inversion and sagging.

Figure 6:
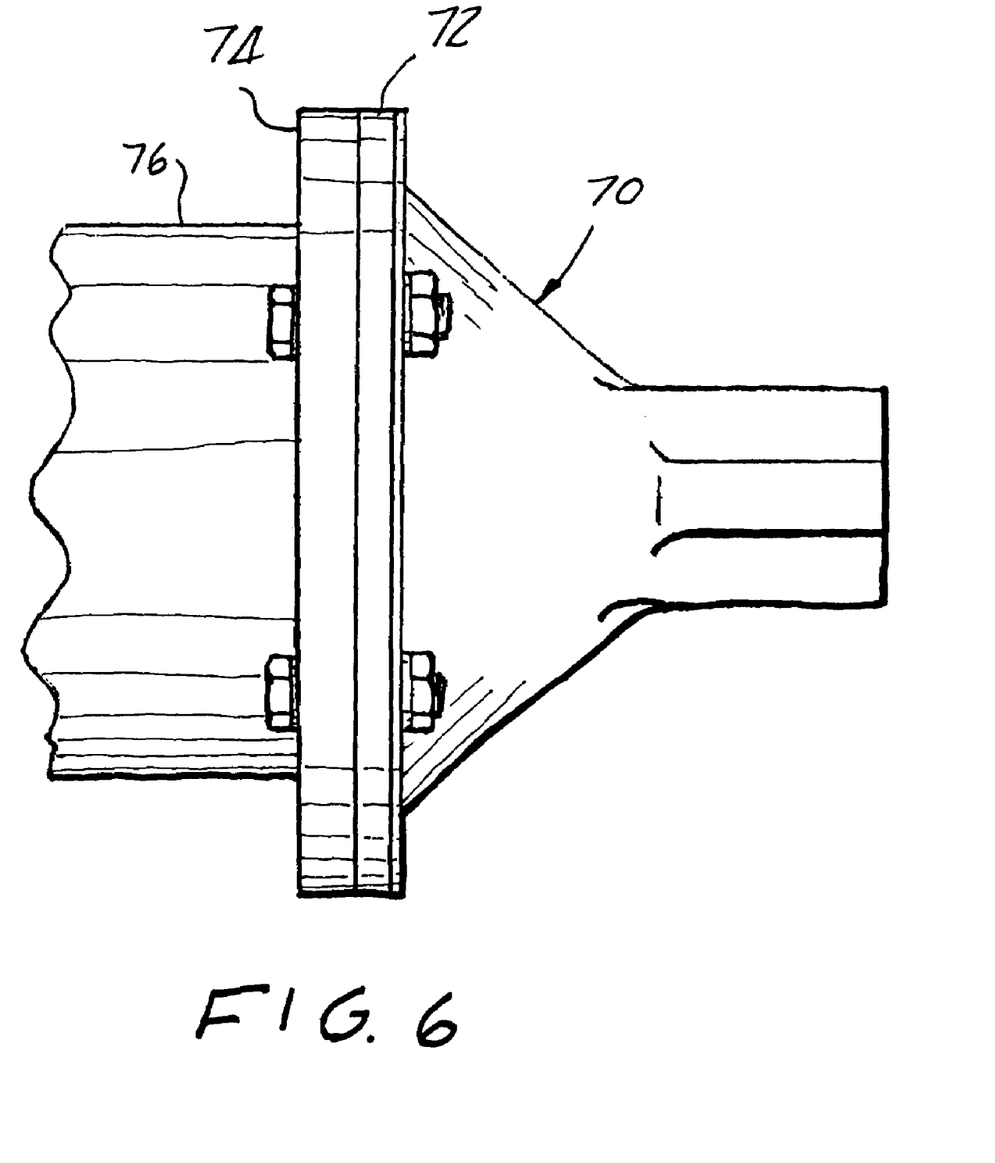
FIG. 6 is a top plan view similar to FIG. 2, and showing an alternate construction.

Turning now to an alternate embodiment illustrated in FIG. 6, a duck-bill type check valve 70 constructed in accordance with the present invention is similar to check valve 20, with the exception that the collar 44 which couples check valve 20 to pipe 40 has been replaced by a flange 72 which is bolted to a generally complementary flange 74 of an effluent pipe 76 in order to secure check valve 70 to pipe 76.

Figure 7:
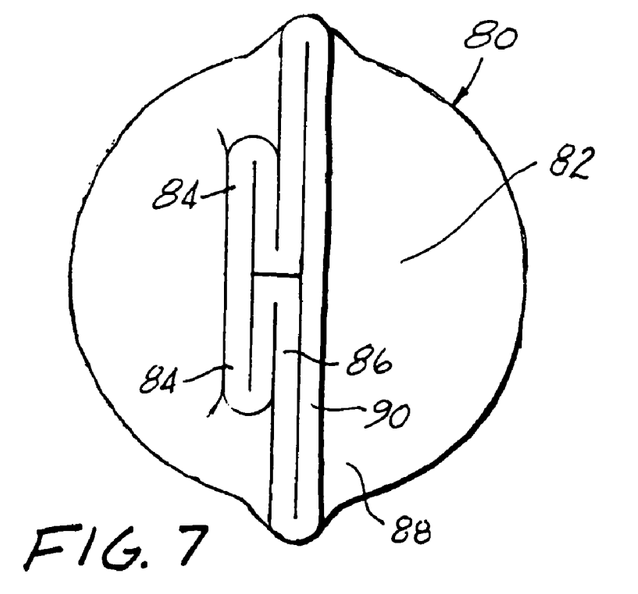
FIG. 7 is an end elevational view similar to FIG. 4, and showing an alternate embodiment of the invention.
Figure 8:
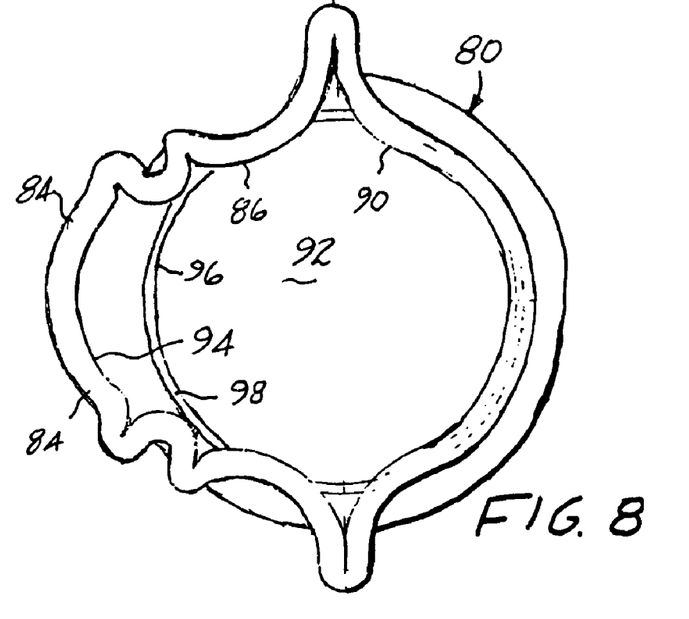
FIG. 8 is an end elevational view similar to FIG. 4, and showing another embodiment of the invention.

In the embodiment illustrated in FIGS. 7 and 8, a check valve 80 constructed in accordance with the present invention includes a bill 82 similar to bill 50 of check valve 20, with the exception that bill 82 includes folds 84 overlying only one lip 86 of valve wall 88, the confronting lip 90 including no fold, as seen in FIG. 7. Upon introducing fluid pressure into the passage 92 of check valve 80, the lips 86 and 90 are parted, and folds 84 are unfolded, as shown in FIG. 8, to provide an opening 94 having a perimeter greater than the perimeter of the outlet 96 of the pipe 98 to which the check valve 80 is coupled.

Figure 9:
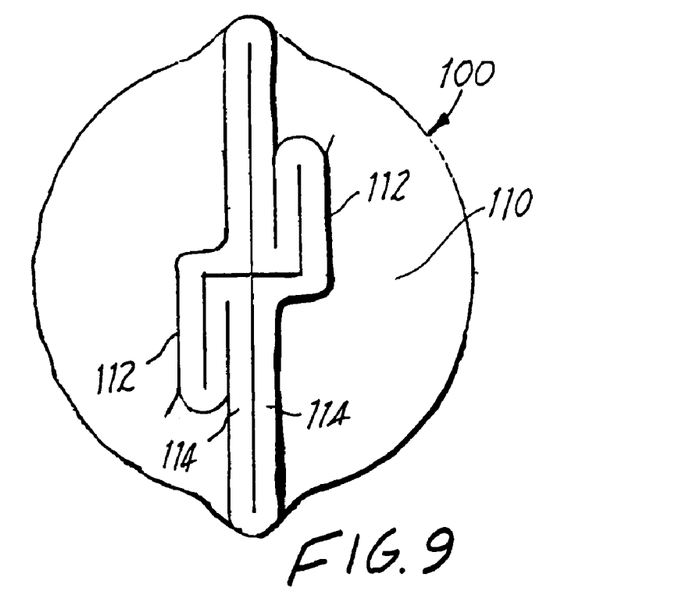
FIG. 9 is an end elevational view similar to FIG. 4, and showing still another embodiment of the invention.

In the embodiment illustrated in FIG. 9, a check valve 100 constructed in accordance with the present invention is similar to check valve 20, with the exception that bill 110 of check valve 100 includes only one fold 112 overlying each lip 114. The lesser number of folds 112 provide an opening of adequate perimeter upon parting of lips 114 to open the check valve 100, while reducing somewhat the complexity of the overall construction of check valve 100.

Figure 10:
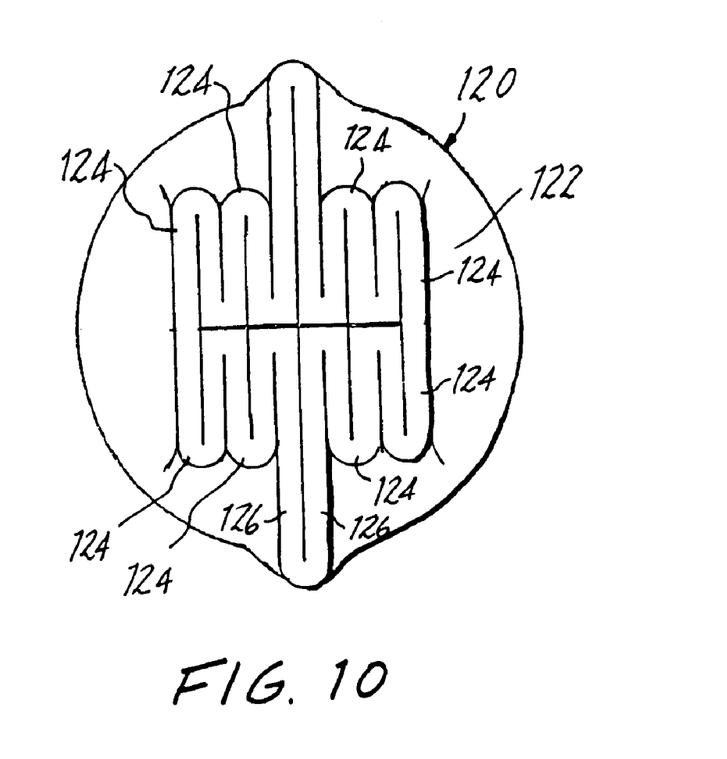
FIG. 10 is an end elevational view similar to FIG. 4, and showing yet another embodiment of the invention.

In the embodiment illustrated in FIG. 10, a check valve 120 constructed in accordance with the present invention is similar to check valve 20, with the exception that bill 122 of check valve 120 includes a plurality of folds 124 overlying one another, as well as respective lips 126. The multiplied folds 124 provide an opening of increased perimeter upon parting of lips 126 to open the check valve 120.

Figure 11:
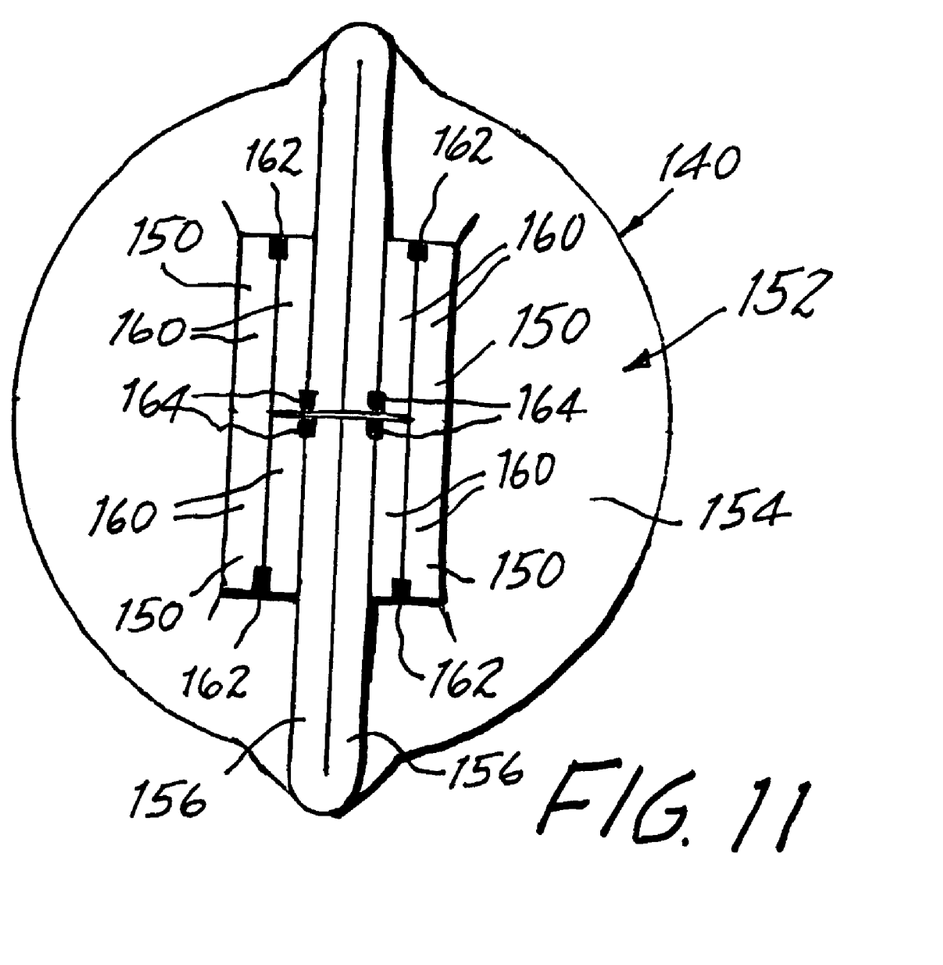
FIG. 11 is an end elevational view similar to FIG. 4, and showing another embodiment of the invention.

In the embodiment illustrated in FIG. 11, a check valve 140 constructed in accordance with the present invention is similar to check valve 20, with the exception that each fold 150, rather than being unitary with the valve member 152 at bill wall 154 and corresponding lips 156, as in previously-described check valve 20 wherein the folds 60 are unitary with valve member 22 at bill wall 54 and lips 56, are constructed with legs 160 integrated with one another by joining corresponding legs 160 at 162 and are integrated with valve member 152 by joining corresponding legs 160 at 164, as by adhesive bonding of an elastomeric material or by another of currently available joining methods.

It will be seen that the present invention attains the several objects and advantages summarized above, namely: Provides a check valve of the duck-bill type having increased resistance to collapse and inversion in response to higher back pressures downstream of the valve; allows opening of the check valve in response to lower pressure differentials across the valve for better performance in the control of effluent in a wider variety of fluid flow systems; resists deleterious sagging of the body of the valve due to the weight of fluid contained within the body of the valve, especially in larger valve sizes, for more effective performance in a wider range of installations; enables effective use of relatively simple duck-bill type check valves in larger sizes in connection with larger effluent systems, such as in storm drain systems; provides a more compact duck-bill check valve, both in length and in diameter, and especially in duck-bill width, for ready installation and use in a wider variety of fluid handling systems; enhances performance in fluid handling systems incorporating duck-bill type check valves; provides duck-bill check valves capable of economical manufacture in a wide range of sizes for exemplary performance over an extended service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A check valve comprising:
   a flexible tubular valve member extending longitudinally between an inlet and a longitudinally opposite outlet, the flexible tubular valve member having a longitudinal passage for conducting a fluid from the inlet to the outlet, and a valve wall extending longitudinally between the inlet and the outlet and circumferentially around the passage;
   the valve wall including a bill extending longitudinally along the valve wall and terminating at a bill end contiguous with the outlet, the bill having a bill wall including laterally opposite lips extending in longitudinal and altitudinal directions adjacent the outlet and having a prescribed altitudinal extent, the bill wall including a transition portion extending longitudinally between the inlet and the lips, and the lips being biased in lateral directions into engagement with one another along a slit extending altitudinally across the bill adjacent the bill end such that the outlet normally is closed against backflow of the fluid into the passage through the outlet by engagement of the lips along the slit; and
   at least one fold in the bill wall, the fold extending longitudinally along a corresponding lip and, when in a folded configuration, including overlying legs extending across the bill in an essentially altitudinal direction, essentially parallel to the slit, so as to overlie the corresponding lip, the fold having a prescribed altitudinal extent and a prescribed longitudinal extent such that upon fluid entering the passage at the inlet and exerting fluid forces upon the valve wall at the bill to unfold the at least one fold and move the legs of the fold laterally, the relative dimensions of the altitudinal extent of the legs of the fold and the altitudinal extent of the bill enables unfolding of the at least one fold and lateral movement of the legs of the fold to part the lips in lateral directions and open the outlet to permit the flow of fluid from the inlet for discharge through an opening at the outlet of the valve member in response to minimum fluid forces upon the bill, and for providing the opening with an increased maximum available perimeter.

2. The check valve of claim 1 including at least two folds extending serially along the corresponding lip.

3. The check valve of claim 2 wherein the at least two folds are essentially contiguous with one another along the essentially altitudinal direction.

4. The check valve of claim 1 including a plurality of folds extending along the corresponding lip.

5. The check valve of claim 4 wherein at least two of the plurality of folds overlie one another.

6. The check valve of claim 1 wherein the at least one fold is unitary with the bill wall.

7. The check valve of claim 1 wherein the at least one fold is integral with the bill wall.

8. The check valve of claim 1 wherein the at least one fold is constructed of a material having memory characteristics establishing biasing forces for biasing the fold into the folded configuration.

9. The check valve of claim 1 wherein the valve member includes at least one fold overlying each lip, each fold, when in a folded configuration, including corresponding legs overlying a corresponding lip and extending essentially parallel to the slit so as to overlie the corresponding lip.

10. The check valve of claim 9 including at least two folds extending serially along each lip.

11. The check valve of claim 10 wherein the at least two folds are essentially contiguous with one another along the essentially altitudinal direction.

12. The check valve of claim 9 including a plurality of folds extending along the corresponding lip.

13. The check valve of claim 12 wherein at least two of the plurality of folds overlie one another.

14. The check valve of claim 9 wherein the at least one fold overlying each lip is unitary with the bill wall.

15. The check valve of claim 9 wherein the at least one fold overlying each lip is integral with the bill wall.

16. The check valve of claim 9 wherein the at least one fold overlying each lip is constructed of a material having memory characteristics establishing biasing forces for biasing the fold into the folded configuration.

17. A check valve comprising:
   a flexible tubular valve member extending longitudinally between an inlet and a longitudinally opposite outlet, the flexible tubular valve member having a longitudinal passage for conducting a fluid from the inlet to the outlet, and a valve wall extending longitudinally between the inlet and the outlet and circumferentially around the passage;
   the valve wall including a bill extending longitudinally along the valve wall and terminating at a bill end contiguous with the outlet, the bill having a bill wall including laterally opposite lips extending in longitudinal and altitudinal directions adjacent the outlet and having a prescribed altitudinal extent, the bill including a transition portion extending longitudinally between the inlet and the lips, and the lips being biased in lateral directions into engagement with one another along a slit extending altitudinally across the bill adjacent the bill end such that the outlet normally is closed against backflow of the fluid into the passage through the outlet by engagement of the lips along the slit;

the bill wall being folded essentially altitudinal upon itself to establish at least one folded portion in the valve wall, the at least one folded portion extending longitudinally along the a corresponding lip and, when in a folded configuration, including overlying legs extending across the bill in an essentially altitudinal direction, essentially parallel to the slit, so as to overlie the corresponding lip, the at least one folded portion having a prescribed altitudinal extent and a prescribed longitudinal extent such that upon fluid entering the passage at the inlet and exerting fluid forces upon the valve wall at the bill to unfold the at least one folded portion and move the legs of the at least one folded portion laterally, the relative dimensions of the altitudinal extent of the legs of the at least one folded portion and the altitudinal extent of the bill enables unfolding of the at least one folded portion and lateral movement of the legs of the at least one folded portion to part the lips in lateral directions and open the outlet to permit the flow of fluid from the inlet for discharge through an opening at the outlet of the valve member in response to minimum fluid forces upon the bill, and for providing the opening with an increased maximum available perimeter.

18. The check valve of claim 17 including at least two folded portions extending serially along the corresponding lip.

19. The check valve of claim 18 wherein the at least two folded portions are essentially contiguous with one another along the essentially altitudinal direction.

20. The check valve of claim 17 including a plurality of folded portions extending along the corresponding lip.

21. The check valve of claim 20 wherein at least two of the plurality of folded portions overlie one another.

22. The check valve of claim 17 wherein the at least one folded portion is unitary with the bill wall.

23. The check valve of claim 17 wherein the at least one folded portion is integral with the bill wall.

24. The check valve of claim 17 wherein the at least one folded portion is constructed of a material having memory characteristics establishing biasing forces for biasing the folded portion into the folded configuration.

25. The check valve of claim 17 wherein the valve member includes at least two folded portions overlying each lip, each folded portion, when in a folded configuration, including corresponding legs overlying a corresponding lip and extending essentially parallel to the slit so as to overlie the corresponding lip.

26. The check valve of claim 25 including at least two folded portions extending serially along each lip.

27. The check valve of claim 26 wherein the at least two folded portions are essentially contiguous with one another along the essentially altitudinal direction.

28. The check valve of claim 25 including a plurality of folded portions extending along the corresponding lip.

29. The check valve of claim 28 wherein at least two of the plurality of folded portions overlie one another.

30. The check valve of claim 25 wherein the at least one folded portion overlying each lip is unitary with the bill wall.

31. The check valve of claim 25 wherein the at least one folded portion overlying each lip is integral with the bill wall.

32. The check valve of claim 25 wherein the at least one folded portion overlying each lip is constructed of a material having memory characteristics establishing biasing forces for biasing the folded portion into the folded configuration.

\* \* \* \* \*